US007066995B1

(12) United States Patent
Barone et al.

(10) Patent No.: US 7,066,995 B1
(45) Date of Patent: Jun. 27, 2006

(54) COMPOSITIONS AND FILMS COMPRISED OF AVIAN FEATHER KERATIN

(75) Inventors: Justin R. Barone, Rockville, MD (US); Walter F. Schmidt, Beltsville, MD (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 75 days.

(21) Appl. No.: 10/805,558

(22) Filed: Mar. 19, 2004

(51) Int. Cl.
*C08L 89/04* (2006.01)
*C09D 189/04* (2006.01)

(52) U.S. Cl. .............................. 106/156.51; 106/156.1; 106/156.5; 71/18; 71/64.13; 47/9; 47/902

(58) Field of Classification Search ............ 106/156.1, 106/156.5, 156.51; 71/18, 64.13; 47/9, 47/902
See application file for complete search history.

(56) References Cited

U.S. PATENT DOCUMENTS

| | | | | |
|---|---|---|---|---|
| 3,642,498 | A * | 2/1972 | Anker | 426/302 |
| 4,135,942 | A * | 1/1979 | Kikkawa | 106/156.5 |
| 5,523,293 | A * | 6/1996 | Jane et al. | 514/21 |
| 6,029,395 | A * | 2/2000 | Morgan | 47/9 |
| 2002/0079074 | A1 | 6/2002 | Griffith | |
| 2002/0148572 | A1 | 10/2002 | Griffith | |

OTHER PUBLICATIONS

Cuq, B., et al., "Effects of Thermomoulding Process Conditions on the Properties of Agro-Materials Based on Fish Myofibrillar Proteins", *Lebensm.-Wiss.u.-Technol.*, vol. 32(2), pp. 107-113, (1999.).
di Gioia, L., et al., "Corn Protein-Based Thermoplastic Resins: Effect of Some Polar and Amphiphilic Plasticizers", *J. Agric. Food Chem.*, vol. 47(3), pp. 1254-1261, (1999).
Orliac, O., et al., "Rheological Studies, Production, and Characterization of Injection-Molded Plastics from Sunflower Protein Isolate", *Ind. Eng. Chem. Res.*, vol. 42(8), pp. 1674-1680 (2003).

Irissin-Mangata, J., et al., "New Plasticizers for Wheat Gluten Films", *European Polymer Journal*, vol. 37, pp. 1533-1541, (2001).
Mangavel, C., et al., "Molecular Determinants of the Influence of Hydrophilic Plasticizers on the Mechanical Properties of Cast Wheat Gluten Films", *J. Agric. Food Chem.*, vol. 51(5), pp. 1447-1452 (2003).
Kim, K., et al., "Influence of Sorghum Wax, Glycerin, and Sorbitol on Physical Properties of Soy Protein Isolate Films", *JAOCS*, vol. 80(1), pp. 71-76, (20030.
Vaz, C., et al., "Mechanical, Dynamic-Mechanical, and Thermal Properties of Soy Protein-Based Thermoplastics with Potential Biomedical Applications", *J. Macromol. Sci.-Physics*, vol. B41(1), pp. 33-46, (2002).
Wang, Y., et al., "Thermal Behavior of Zein-Based Biodegradable Films", *Starch*, vol. 55, pp. 25-29, (2003).
Yoshino, T., et al., "Influence of Preparation Conditions on the Physical Properties of Zein Films", *JAOCS*, vol. 79(4), pp. 345-349, (2002).
Orliac, O., et al., "New Thermo-Molded Biodegradable Films Based on Sunflower Protein Isolate: Aging and Physical Properties", *Macromol. Symp.*, vol. 197, pp. 193-206, (2003).
Pommet, M., et al., "Thermoplastic Processing of Protein-Based Bioplastics: Chemical Engineering Aspects of Mixing, Extrusion and Hot Molding", *Macromol. Symp.*, vol. 197, pp. 207-217, (2003).
Domenek, S., et al., "Biodegradability of Wheat Gluten Based Bioplastics", *Chemosphere*, vol. 54, pp. 551-559, (2004).

(Continued)

*Primary Examiner*—David Brunsman
(74) *Attorney, Agent, or Firm*—John Fado; G. Byron Stover

(57) ABSTRACT

A composition suitable for making films, wherein the composition contains keratin obtained from avian feathers and at least one OH containing plasticizer. Protein-based films containing at least one protein and at least one OH containing plasticizer, wherein the protein is a protein whose PE value is $\geq 2.5$ where $PE=(S+T+Y)/C$ where PE is plasticizer efficiency and where S, T, Y, and C are the amino acids serine, threonine, tyrosine, and cysteine, respectively, in the protein. Preferably the protein is keratin obtained from avian feathers.

12 Claims, 7 Drawing Sheets

OTHER PUBLICATIONS

McHugh, T., et al., "Plasticized Whey Protein Edible Films: Water Vapor Permeability Properties", *J. Food Science*, vol. 59(2), pp. 416-419, (1994).

Sothornvit, R., et al., "Formation Conditions, Water-Vapor Permeability, and Solubility of Compression-Molded Whey Protein Films", *J. Food Science*, vol. 68(6), pp. 1985-1989, (2003.).

di Gioia, L., et al., "Plasticization of Corn Gluten Meal and Characterization of the Blends", *Macromol. Symp.*, vol. 144, pp. 365-369, (1999.).

* cited by examiner

COMPOSITIONS AND FILMS COMPRISED OF AVIAN FEATHER KERATIN

BACKGROUND OF THE INVENTION

The present invention relates to a composition suitable for making films, wherein the composition contains keratin obtained from avian feathers and at least one OH containing plasticizer. The present invention also relates to protein-based films containing at least one protein and at least one OH containing plasticizer, wherein the protein is a protein whose PE value is $\geq 2.5$ where PE=(S+T+Y)/C where PE is plasticizer efficiency and where S, T, Y, and C are the amino acids serine, threonine, tyrosine, and cysteine, respectively, in the protein.

There has been much recent interest in developing biopolymer materials for many different applications. Biopolymers, whether natural or synthetic, are biocompatible and therefore appropriate for biomedical applications such as implantation or drug delivery. In addition, biopolymers are being considered as alternatives to commodity synthetic polymers because the biopolymers are biodegradable or environmentally-friendly. Biopolymers from sustainable resources would have a distinct advantage over petroleum-derived polymers in this respect. Naturally derived biopolymers such as gelatin, soybean and wheat proteins, and sunflower proteins have been processed into films using a variety of techniques. These techniques include solvent-cast films as well as thermally-processed films. Solvent casting is tedious and if the solvents are volatiles would defeat the purpose of environmental-friendliness. Thermal processing is simpler and is the method currently used in industry. If biopolymers from sustainable resources are to be used commercially, the biopolymers have to be processed through preferred processing methods. It becomes imperative to identify biopolymers from sustainable resources that can be easily processed using available technology.

Keratin is a biologically important protein because it comprises most of the outer layers of animals. Keratin can be found in hair, nail, epidermis, hoof, horn, and feather (Vincent, J., Structural Biomaterials, Princeton University Press, 1990). Keratin is a unique protein because it contains a large amount of cysteine relative to other proteins (Fraser, R. D. B., et al., Keratins: Their Composition, Structure, and Biosynthesis, Charles C. Thomas Publisher, 1972, p. 31). Cysteine is a sulfur-containing amino acid and can form sulfur—sulfur (S—S) bonds or "cross-link" with other intra- or inter-molecular cysteine molecules. The cross-links plus other protein structural features, like crystallinity and hydrogen-bonding, give keratin very high physical properties (Fraser, R. D. B., and T. P. MacRae, Molecular structure and mechanical properties of keratins, Symposia of the Society for Experimental Biology, Number XXXIV: The Mechanical Properties of Biological Materials, Cambridge University Press, 1980, p. 211–246). The amount of cysteine varies depending on the keratin source. Wool keratin contains about 15% cysteine while feather keratin contains about 7% cysteine (Fraser, R. D. B., et al., 1972; K. M. Arai, K. M., et al., Eur. J. Biochem., 132: 501 (1983)).

Thermally processing natural keratin is difficult because of the permanent cross-links. The keratin must be reduced (i.e., covalent sulfur—sulfur bonds must be broken) to get a soluble fraction for further processing. There are many techniques to reduce keratin (Schrooyen, P. M. M., et al., J. Agric. Food Chem., 48: 4326–4334 (2000)). Acid and alkali hydrolysis, alkaline sodium sulfide treatment, enzymatic treatment, and ammonium copper hydroxide treatment result in S—S reduction and peptide bond breakage. The sulfur—sulfur reduction is an advantage but the peptide bond breakage is a disadvantage. Sulfitolysis with performic acid and use of thiols in concentrated urea solutions at alkaline pH will selectively reduce S—S bonds without peptide bond breakage. The thiol technique appears to be the currently preferred method because the S—S bonds can re-form easily after processing (Schrooyen, P. M. M., et al., J. Agric. Food Chem., 49: 221–230 (2001)). However, reduction requires multiple chemical treatment steps, sufficient time for reaction, and subsequent processing to eliminate the chemicals used for treatment. Therefore, reduction of even small amounts of keratin requires hours to days.

We have found that treating natural keratin (e.g., from feather quill and fiber) with OH containing compounds (e.g., glycerol) surprisingly allows for the treated protein to be pressed into films at typical polymer processing temperatures. Relatively clear, cohesive films are easily formed. No reduction or oxidation agents are used in the process.

SUMMARY OF THE INVENTION

The present invention relates to a composition suitable for making films, wherein the composition contains keratin obtained from avian feathers and at least one OH containing plasticizer.

The present invention also relates to protein-based films containing at least one protein and at least one OH containing plasticizer, wherein the protein is a protein whose PE value is $\geq 2.5$ where PE=(S+T+Y)/C where PE is plasticizer efficiency and where S, T, Y, and C are the amino acids serine, threonine, tyrosine, and cysteine, respectively, in the protein. Preferably the protein is keratin obtained from avian feathers.

BRIEF DESCRIPTION OF THE DRAWINGS

The patent or application file contains at least one drawing executed in color. Copies of this patent or patent application publication color drawing(s) will be provided by the Office upon request and payment of the necessary fee.

DETAILED DESCRIPTION OF THE INVENTION

Figure 1:
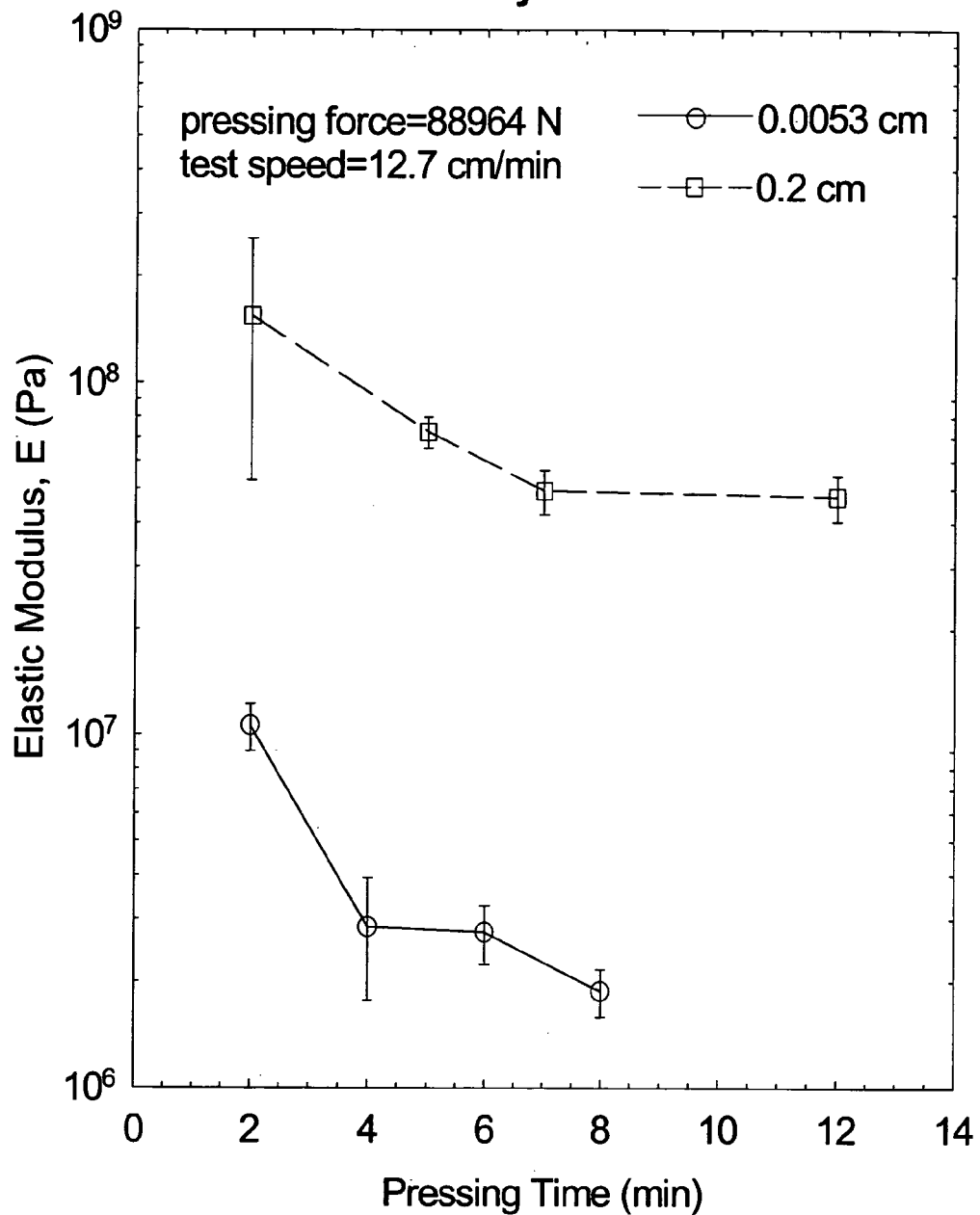
FIG. 1 shows the effect of pressing time on elastic modulus for films made from 50:50 wt % keratin:glycerol with 0.0053 cm and 0.2 cm long fibers pressed at 160° C. and 88964 N (test speed was 12.7 cm/min.)

Treating proteins such as avian keratin (e.g., from feather quill and fiber) with OH containing compounds (e.g., glycerol) surprisingly allows for the treated protein to be pressed into films at typical polymer processing temperatures. Relatively clear, cohesive films are easily formed. No reduction or oxidation agents are used in the process.

Each year, the U.S. poultry industry discards ca. 4 billion pounds of chicken feathers (Parkinson, G., Chem. Eng., 105(3): 21 (1998)). In addition to feathers, the feather waste contains fat, water, and soluble protein. Some of the waste can be autoclaved and turned into a low-value animal feed; the rest must be disposed of and thus creates a large waste problem for the poultry industry. The feather keratin which may be utilized in the present invention is generally obtained from poultry feather waste and can be used after minimal cleaning to remove soluble fats and blood in order to minimize any adverse affects during the protein thermal processing. Thermal processing proceeds at temperatures concurrent with typical hospital autoclaving procedures so all bacteria on the feathers are killed regardless of the cleaning process. Feathers from any avian species (e.g., chickens, turkeys) may be utilized.

U.S. Pat. No. 5,705,030 describes a process to efficiently and cost-effectively clean the feather waste to obtain pure feather. The process can further separate the feather into fiber and quill fractions. The feather keratin utilized in the present invention may be obtained using the process described in U.S. Pat. No. 5,705,030. The keratin feather fiber may be cleaned and separated from the quill fraction using the method described in U.S. Pat. No. 5,705,030 which comprises five basic steps: collecting raw feathers, washing the feathers in a water soluble organic solvent, drying the feathers, removing the fiber from the quill shafts, and collecting the fiber and quill fractions (however, other cleaning methods may be used herein as long as any residual material from the cleaning process does not interfere with the processing of the films). The feather fiber generally has a uniform macroscopic diameter of approximately 0.0005 cm. Fibers of about 0.02 cm or greater length (e.g., about 0.02–about 1 cm) may be made by grinding feather fiber using a Retsch ZM 1000 centrifugal grinder. The rotational velocity of the instrument is 15000 rpm and contains a torque feedback so as to not feed in too much material and overload the motor. The fiber is fed in slowly to avoid motor overload and to minimize frictional heating of the instrument and the fiber. Fiber lengths smaller than about 0.02 cm may be made by grinding the fiber on a Retsch PM 400 ball mill. Feather fiber is loaded into 500 ml stainless steel grinding vessels so that it occupies about a quarter of the volume. The grinding media are four 4 cm stainless steel spheres for a total of 1132 g grinding media. Grinding proceeds at 200 rpm for 30 minutes. Each ground fraction is sieved on a Retsch AS 2000 vibratory mill. To achieve good separation, 1.0 cm glass beads are used as sieving aids to aid the separation process. Sieving occurs at a constant frequency concurrent with the AC outlet but amplitude and time can be varied. The material is loaded into the top sieve of the stack. The sieving stack contains eight sieves with hole sizes from 0.0710 cm to 0.0038 cm. Sieving at an amplitude of 1.0 (arbitrary instrument scale) for 60 minutes effectively separates the "fines" from the desired average fiber length.

The fiber portion of the feather as well as the quill consists primarily of the protein keratin. Although both portions of the feather are made of keratin, each has unique properties. Keratin feather fiber and inner quill material are 41% α-helix, 38% β-sheet, and 21% random (disordered) protein structures. The α-helical structure contains important intramolecular hydrogen bonds between the amide and carbonyl groups in the protein backbone. The β-sheet structure contains major inter-chain hydrogen bonding between the amide and carbonyl groups in the protein backbone. The hydrogen bonding can be correlated with the bound water in the protein structure. The helices can pack together to form crystals. The semi-crystalline and cross-linked structure in keratin feather fiber results in a polymer with a relatively high elastic modulus of approximately 3.4 to 5 GPa. The outer quill contains 50% α-helix with 20% β-sheet and the balance disordered structures. Differential scanning calorimetry (DSC) shows that outer quill has a crystalline melting temperature of about 230° C. while the feather fiber and inner quill have a melting temperature of about 240° C.

Plasticizers which may be used with feather keratin include ethylene glycol (($CH_2OH)_2$), propylene glycol ($CH_3OHCHOHCH_2OH$), glycerol (($CH_2OH)_2CHOH$), sorbitol (($CH_2OH)_2(CHOH)_4$), and vinyl alcohol (($HCOHCH_2)_n$) where n is about 1 to about 100 (e.g., 1–100; preferably about 1 to about 10 (e.g., 1–10)). Water does not work very well as a plasticizer in thermal processing above 100° C. because it evaporates. Ethylene glycol, propylene glycol, and glycerol are all liquid plasticizers at the processing temperatures used herein. Sorbitol melts at about 100° C. and can be used as a plasticizer at temperatures above about 100° C. However, sorbitol can be put into aqueous solution or in solution with one of the other liquid plasticizers and be used to produce films from the protein; similarly, hydrophilic higher molecular weight plasticizers like vinyl alcohol (($HCOHCH_2)_n$ where n is about 10 to about 100) may also be put into aqueous solution or in solution with one of the other liquid plasticizers to produce a film from the protein.

In the presence of low molecular weight plasticizer (e.g., glycerol) exclusively, the keratin amount is at least about 50% (e.g., at least 50%) by weight or volume since anything less will not create a cohesive film during processing; thus the plasticizer amount is about 1 to about 50% (e.g., 1 to 50%) and the keratin is about 50% to about 99% (e.g., 50% to 99%). Therefore, when a film is comprised entirely of keratin and low molecular weight plasticizer (e.g., glycerol, ethylene glycol, propylene glycol, etc.), the amount of keratin can vary from about 50% to about 70% (e.g., 50–70%) in order to produce a very flexible film, the amount of keratin can vary from about 71% to about 80% (e.g., 71–80%) in order to produce a moderately flexible film, or the amount of keratin can vary from about 81% to about 99% (e.g., 81–99%) in order to produce a stiff film. After placement in an environment where water is present (e.g., in an agricultural field), water/plasticizer exhange will cause the low molecular weight plasticizer (e.g., glycerol) to diffuse out of the film and be replaced by water. Therefore, very flexible or moderately flexible films will change to stiff films over time; eventually the stiff film can be broken up by environmental stress (e.g., wind and rain) and will degrade into the environment (e.g., soil). If the film is composed of keratin, high molecular weight plasticizer (e.g., vinyl alcohol (($HCOHCH_2)_n$ where n is about 10 to about 100)) and low molecular weight plasticizer (e.g., glycerol), then the relative amount of each component can vary depending on the application. For flexible films the amount of low molecular weight plasticizer (e.g., glycerol) can be about 31% to about 50% (e.g., 31–50%) in order to maintain flexibility, with the balance being a combination of keratin and high molecular weight plasticizer (e.g., vinyl alcohol where n is about 10 to about 40). For moderately flexible films the amount of low molecular weight plasticizer (e.g., glycerol) should be about 21% to about 30% (e.g., 21–30%), with the balance being a combination of keratin and high molecular weight plasticizer (e.g., vinyl alcohol where n is about 41 to about 80). For stiff films, the amount of low molecular weight plasticizer (e.g., glycerol) should be about 0% to about 20% (e.g., 0–20%), with the balance being keratin and high molecular weight plasticizer (e.g., vinyl alcohol where n is from about 81 to about 100 or greater). Depending on the thermal processing conditions, the stiff material may have to be made with more glycerol and then have the glycerol driven off to get a film with nearly no glycerol and mostly keratin and high molecular weight plasticizer.

The processing temperature of feather keratin and plasticizer is generally from about 100° C. to about 180° C. (e.g., 100° C. to 180° C.). Processing times will vary with the temperature and are readily determined. Films can be processed at about 160° C. to about 180° C. (e.g., 160° C. to 180° C.) for up to about 10 minutes although protein degradation may become a problem after that; generally at these higher temperatures the processing time can be about 2 minutes or less. Films can be processed at about 100° C. to about 140° C. (e.g., 100° C. to 140° C.) for about 6 minutes or higher (e.g., 10 minutes) to obtain cohesive films and not obtain any protein degradation. There may be an advantage to processing at lower temperatures because some protein degradation and some plasticizer loss is evident at the higher temperatures, albeit both are small. For optimal processing, a temperature between about 160° C. and about 180° C. (e.g., 160° C. to 180° C.) for several minutes would minimize both process time and processing cost.

Keratin/plasticizier blends can be mixed on an extruder then processed into products on an extruder die or compression molded or injection molded into suitable products. Processes that are well known in the art may be used to manufacture the films described herein. Molded articles may be prepared from the compositions and films described herein using methods and equipment known in the art.

In another aspect of the invention, if a cysteine containing protein (avian keratin) satisfies the requirement $PE \geq 2.5$ where $PE=(S+T+Y)/C$ then it can be plasticized and thermally processed (where PE is plasticizer efficiency; where S, T, Y, and C are the amino acids serine, threonine, tyrosine, and cysteine, respectively, in the protein). Serine, threonine, and tyrosine are —OH containing amino acids and are able to be plasticized by —OH containing plasticizers. PE denotes the number of mobile sites (i.e., S, T and Y) in the protein molecule relative to the immobile sites (i.e., C) in the protein molecule; in other words, the S, T, and Y sites in the molecule can diffuse while the C sites cannot. During processing, the mobile sites diffuse and intertwine ("entangle") with other mobile sites on other molecules, which provides the mechanism for obtaining cohesive films. In proteins, the amino acid cysteine contains sulfur that can easily bond with other sulfurs on other cysteines to create sulfur—sulfur bonds. When the other cysteines are on the same molecule then intra-molecular bonds are formed, when the other cysteines are on another molecule then inter-molecular bonds are formed. Currently, there is not a sufficient amount of evidence to suggest how much of each intra- or inter-molecular bond is present; thus it is not possible to simply correlate the total amount of C to processability. However, it is possible to correlate the total amount of C to processability if the PE formula described herein is used. Inter-molecular sulfur-sulfur bonds are known as cross-links (traditionally, cross-links are covalent bonds between neighboring molecules as per rubber elasticity theory).

Figure 7:
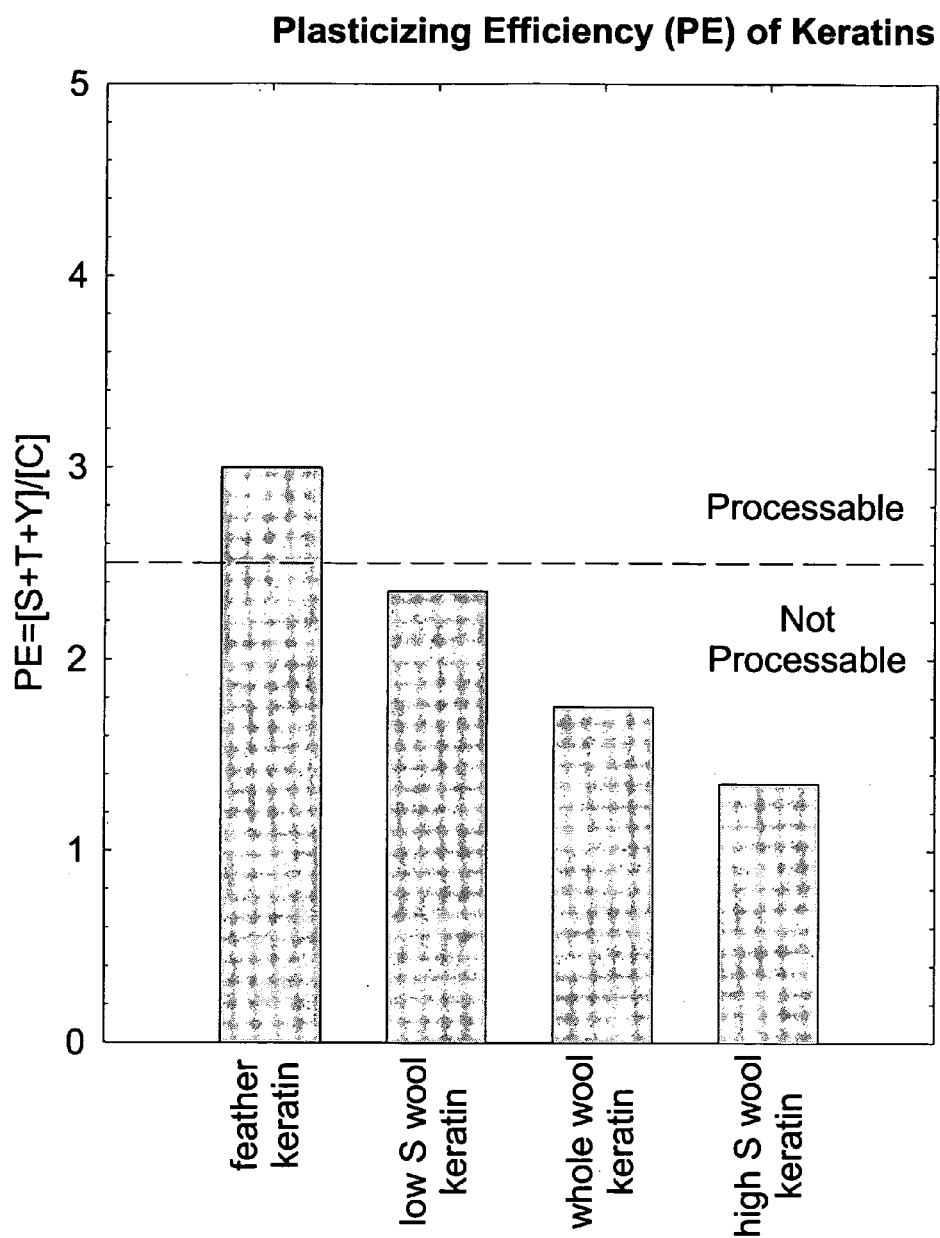
FIG. 7 shows plasticizer efficiency of keratins.

Currently, it is difficult to determine the extent of cross-links (i.e., the amount of inter- and intra-molecular sulfur—sulfur bonds). So, as a first approximation, it is currently assumed that the cysteine content represents the extent of cross-linking (i.e., all of the sulfur—sulfur bonds are intermolecular). However, while the amount of cysteine could be assumed to be enough to classify a protein as thermally processable versus not thermally processable, it is not rigorous in the sense that some proteins contain higher amounts of cysteine than other proteins but can still be processed. This is because of the higher —OH content. For example, feather keratin has 7.3% cysteine and low S wool has 6.8% cysteine. Feather keratin is processable because it contains S+T+Y=21.9 for a PE of 3, while low S wool is not processable because it contains S+T+Y=16.0 for a PE of 2.4. FIG. 7 shows a preliminary survey of processable versus not processable cysteine containing keratins using the PE formula. In the present invention, preferably the protein is not obtained from milk, more preferably the protein is not whey protein Plasticizers which may be used with proteins include ethylene glycol (($CH_2OH)_2$), propylene glycol ($CH_3OHCHOHCH_2OH$), glycerol (($CH_2OH)_2CHOH$), sorbitol (($CH_2OH)_2(CHOH)_4$), and vinyl alcohol (($HCOHCH_2$)$_n$) where n is about 1 to about 100 (e.g., 1–100; preferably about 1 to about 10 (e.g., 1–10)). Water does not work very well as a plasticizer in thermal processing above 100° C. because it evaporates. Ethylene glycol, propylene glycol, and glycerol are all liquid plasticizers at the processing temperatures used herein. Sorbitol melts at about 100° C. and can be used as a plasticizer at temperatures above about 100° C. However, sorbitol can be put into aqueous solution or in solution with one of the other liquid plasticizers and used to produce films from the protein.

When water is the plasticizer, a film can be formed but most of the water evaporates at high temperatures and the film is brittle. When ethylene glycol, propylene glycol, or glycerol are the plasticizers, they remain embedded in the protein structure and produce very flexible films. Over time, any amount of plasticizer above the (S+T+Y) content will diffuse out of the film; this is because the plasticizer forms hydrogen bonds with the protein and any excess plasticizer is free to diffuse out. In the presence of water, the plasticizer will eventually diffuse out depending on the molecular weight of the plasticizer and be replaced by water in the protein structure. The flexibility of the films will be lost and they will become brittle. Ethylene glycol, propylene glycol, and glycerol have been used to thermally process cohesive films up to 50% by weight of plasticizer; however, with feather keratin, anything over 21.9% by weight of plasticizer diffuses out over time because the S+T+Y content of feather keratin is 21.9%. Generally, the amount of plasticizer used is ≤ the S+T+Y content of the protein.

It is possible to modify proteins with solid plasticizers in solution with water or another liquid plasticizer. Solid plasticizers include sorbitol, polyvinyl alchohol, or polymers of ethylene glycol (PEG) or propylene glycol (PPG). The liquid phase serves to increase diffusion so the large plasticizer molecule can hydrogen-bond with the S, T, and Y groups and the liquid will then diffuse out. What is left is a film with tougher properties depending on the molecular weight of the plasticizer (which is important if one desires large diffusion times (months to years) of plasticizer to maintain physical properties over the lifetime of films that will be exposed to water). To date, only small amounts of high molecular weight plasticizer have been used because it is the mole percentage, not weight percentage, which is important in modification of the protein. So the higher the molecular weight, the less plasticizer by weight that is needed to hydrogen bond with the —OH groups in the protein. Blends of PPG, PVA, and PEG could be made with any fraction relative to protein to make films with PPG, PVA, and PEG up to very high contents of plasticizer.

The films of the present invention can also be used to make food packaging. Feather keratin is insoluble in water because of the cysteine content.

It is anticipated that the plasticizer (e.g., glycerol)/protein (e.g., feather keratin) blend will be suitable for making mulching films which would last about 6 months once in the field. A 60:40 by weight blend of feather keratin:glycerol will make a very easily processable and very flexible film. This film can then be put into the field to suppress weed growth during the growing season. Unlike polyethylene mulching films, which need to be collected at the end of the growing season, the protein-based films described herein will slowly degrade and do not have to be collected. The slightly higher cost of the protein-based films is more than offset by the lack of labor cost to collect it from the field, thus making it highly competitive with the current state of the art. In the short term, excess glycerol will begin to diffuse out of the mulching film during storage and may continue once it is placed in the field. While the excess glycerol may aid processing, the films remain quite flexible even with the 21.9% hydrogen-bonded plasticizer in the protein structure. Once in the field, the 21.9% glycerol plasticizer will slowly begin to exchange with water in the environment. The film needs to be designed so this process takes approximately 6 months. If water exchanges too quickly with glycerol, a higher molecular weight plasticizer needs to be used to slow down diffusion. Once water exchanges with the plasticizer in the protein structure, the film will be embrittled and will begin to crack under environmental stress such as wind, rain, etc. When the field is turned over for the next planting season, the films will be easily broken up and incorporated into the soil. Proteins degrade when enzymes attack them and the enzymes to degrade keratin naturally occur in the environment. Proteins contain large amounts of nitrogen and therefore have the added benefit as serving as nitrogen sources, or fertilizer, for the soil as they are enzymatically degraded. With the protein-based films described herein, herbicide such as 2,4-dichlorophenoxy acetic acid can be incorporated into the plasticizer phase so the film will contain the herbicide once processed. Once in the field, the herbicide will diffuse into the soil along with the diffusing plasticizer.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described.

The following examples are intended only to further illustrate the invention and are not intended to limit the scope of the invention as defined by the claims.

EXAMPLES

Feather Keratin: Keratin feather fiber was obtained from Featherfiber® Corporation (Nixa, Mo.). The keratin feather fiber was cleaned and separated from the quill fraction according to a process described in U.S. Pat. No. 5,705,030. The feather fiber was semi-crystalline and had a constant diameter of approximately 0.0005 cm. The density of feather fiber was determined by displacing a known volume and weight of ethanol with an equivalent amount of fiber. A density value of 0.89 g/cm$^3$ was obtained.

A mixed feather fiber/quill fraction was obtained from Featherfiber® Corporation. The outer quill was separated from the inner quill and feather fiber through grinding on a ball mill. Ten grams of mixed feather fiber/quill was placed into a 500 ml stainless steel grinding vessel. Twenty-eight 2 cm stainless steel balls were placed in the vessel as well. The feather material was then ground at 200 rpm for 25 minutes. The resulting material was then hand-sieved for 15 minutes through a sieving stack with hole sizes from 0.1 cm to 0.0038 cm. Visual inspection revealed that the fraction >1 mm was outer quill while the other fractions were mixtures of feather fiber and quill. Differential scanning calorimetry (DSC) confirmed that larger fractions were primarily outer quill while smaller fractions were primarily feather fiber and inner quill. Only the fraction >1 mm was used for further experimentation.

Feather fibers of 0.2 cm length were made by grinding in a Retsch ZM 1000 centrifugal grinder. The rotational velocity of the instrument was 15000 rpm and contained a torque feedback so as to not feed in too much material and overload the motor. The fiber was fed in slowly to avoid motor overload and to minimize frictional heating of the instrument and the fiber. Feather fiber of 0.0053 cm length was made by grinding the fiber on a Retsch PM 400 ball mill. Feather fiber was loaded into 500 ml stainless steel grinding vessels so that it occupied about a quarter of the volume. The grinding media was four 40 mm stainless steel spheres for a total of 1132 g grinding media. Grinding proceeded at 200 rpm for 30 minutes. This resulted in a feather fiber "powder". Each ground fraction was sieved by hand through a sieving stack with hole sizes from 0.1 cm to 0.003.8 cm. Vigorously shaking the stack for more than 15 minutes produced the desired fiber fraction. The fraction used goes through the 0.0075 cm sieve but not the 0.0053 cm sieve.

Film Preparation: Glycerol (density=1.26 g/cm$^3$) was added to keratin from 15 to 80 weight percent (wt %). For the 2 mm fibers, the glycerol was hand-mixed in. The fibers eventually became "sticky". After observation of "stickiness", the system was hand-mixed for 15 minutes. For the 0.053 mm fibers, mixing occurred on a Brabender mixing head. First, the fibers were added into the mixing head then the glycerol was slowly added. Mixing proceeded at 40° C. and 50 rpm for 40 minutes. The total material occupied 70% of the volume of the mixer. Mixing of the 0.053 mm fiber/glycerol system resulted in a "paste". Attempts to mix the 2 mm fiber/glycerol system on the Brabender mixing head resulted in significant shortening of the fiber length.

Following mixing, each sample was sandwiched between aluminum foil and pressed into films in a Carver Press Autofour/30 Model 4394 at 160° C., 88964 N for 2 to 12 minutes. The film was then removed and allowed to air cool until it reached room temperature. As a control, pure keratin material was also pressed under the same conditions but did not result in a cohesive film.

It was found that the Brabender-mixed samples would press easily into cohesive films right away. However, the hand-mixed films did not press into cohesive films until about 15 hours later when stored at room temperature. Placing the hand-mixed samples in a convection oven at 60° C. for 45 minutes allowed them to be pressed into clear, cohesive films.

Samples for testing were cut from the films using a pair of surgical scissors. The sample size was the ASTM D638 Type IV dogbone sample reduced to 75% of its recommended size. Film thickness varies depending on glycerol content but ranges from 0.016 cm for the 15 wt % glycerol to 0.006 cm for the 50 wt % glycerol. It is not possible to press cohesive films from the material when the glycerol content is greater than 50 wt %.

Mechanical Testing of Films: Mechanical testing of the dogbone films was performed immediately after sample preparation. For the study on initial fiber size, pressing time, and glycerol content, films are tested immediately after sample preparation, i.e., within 20 minutes of film pressing. For the study on glycerol loss and water exposure, samples are tested after the described time. Uniaxial tensile testing is performed using a Com-Ten Industries 95 RC Test System. The distance between the grips is 1.9 cm and the applied test speed is either 2.54 cm/min or 12.7 cm/min. A minimum of three films for each condition is tested.

DSC of Films: The effect of glycerol and thermal processing was assessed using a TA Instruments 910s Differential Scanning Calorimeter (DSC). Only one heating cycle was employed. The DSC analysis proceeded from 30° C. to 320° C. at a heating rate of 10° C./min according to ASTM D 3417. The assignment of peaks and integration of peak areas was performed according to ASTM D 3418.

RESULTS AND DISCUSSION

Figure 2:
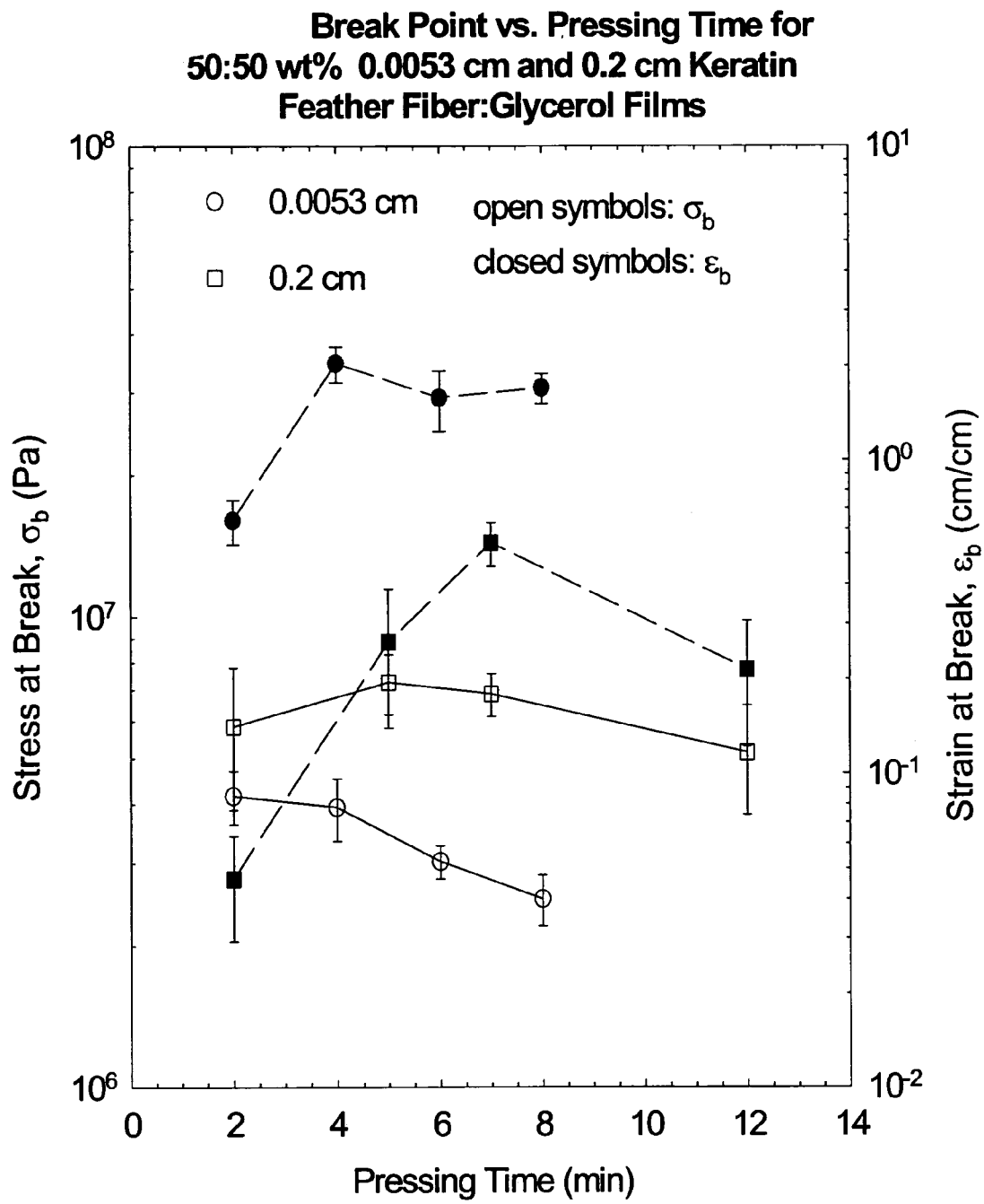
FIG. 2 shows the effect of pressing time on break point for films made from 50:50 wt % keratin:glycerol with 0.0053 cm and 0.2 cm long fibers pressed at 160° C. and 88964 N (test speed was 12.7 cm/min.)

FIG. 1 shows the effect of pressing time on the elastic modulus for 50:50 wt % keratin feather fiber/glycerol films pressed at 160° C. and 88964 N. The modulus, E, decreased as the films were pressed for longer periods of time. FIG. 2 shows the effect of pressing time on the yield point of the films. The stress at break, $\sigma b$, decreases slightly at higher pressing times. Increasing pressing time increases strain to break, $\epsilon b$. In other words, the films become more ductile as the films are pressed for longer periods of time. This is because there is more time for the mobile portions of the chain, S, T, and Y, to inter-diffuse or entangle with each other. From FIGS. 1 and 2, it appears that pressing for longer than about 7 minutes for the films made from 0.2 cm long initial fiber lengths will not appreciably affect film properties. Likewise, pressing the 0.0053 cm initial fiber length films for longer than about 4 minutes will not appreciably increase film properties. Films made from 0.2 cm long keratin feather fiber have larger yield stress and elastic modulus values than films made from 0.0053 cm long keratin feather fiber. However, the films made from the shorter fibers break at over 100% strain. So varying the initial fiber length in the film making process is a way to vary the properties, e.g., the larger the initial fiber length, the stronger and stiffer the films will be, whereas the shorter the initial fiber length, the "tougher" and more ductile the films will be.

Figure 3:
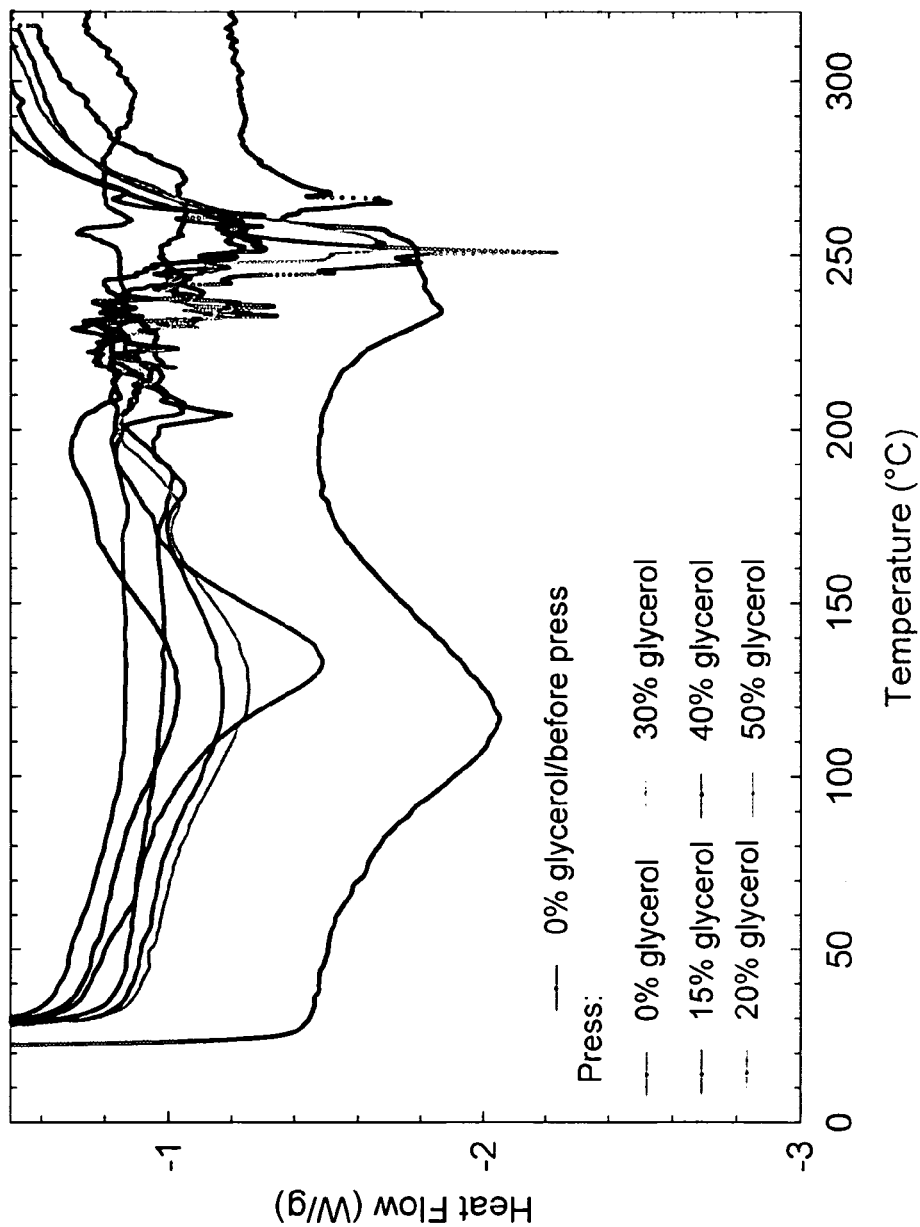
FIG. 3 shows DSC results for 0.0053 cm keratin feather fiber:glycerol films and virgin keratin.

The temperature of 160° C. observed in the DSC scan is higher than that of water but lower than that of glycerol, indicating that glycerol had most likely replaced water in the protein structure. So, glycerol was not lost during the pressing process. The physical property data showed this because, if glycerol was lost, it would be expected that the films would become more brittle. DSC analysis confirms the persistence of glycerol in the keratin structure. FIG. 3 shows the concurrent DSC scans for the 0.053 mm keratin materials. Each curve had two peaks, a low temperature peak associated with the amount of hydrogen-bound water in the keratin (sometimes referred to as the denaturation peak) and a higher temperature peak which corresponded to the crystalline melting temperature of the keratin. Table I shows the position of the low temperature peak, $T_h$, the low temperature peak area, $\Delta Q_h$, the high temperature peak, $T_m$, and the high temperature peak area, $\Delta Q_m$. For the films containing glycerol, the low temperature peak shifted to higher temperatures, i.e., higher than the denaturation temperature of the protein, which is observed near 100° C. Glycerol has a boiling point of about 290° C. This indicated that the glycerol may have replaced inter- and intra-molecular water in crystalline keratin, enabling the keratin film formation. This does not appear unrealistic as water was most likely bound to the hydrophilic amino acids, especially serine (Ser), threonine (Thr), and tyrosine (Tyr) in the keratin molecule. Glycerol, a hydrophilic molecule, would be soluble at the same hydrophilic sites. The largest difference in the thermal properties manifested in the crystalline peak. Simply pressing the 0.0053 cm keratin feather fiber material at 160° C. resulted in a loss of hydrogen-bound water and a significant decrease in the crystalline peak. A small peak appeared at around 200° C. The addition of glycerol caused the peak near 200° C. to disappear and the crystalline melting peak to narrow, i.e., become sharp, and increase. The broad melting peaks, observed for no or low glycerol concentration, probably corresponded to crystals of various sizes. Processing with glycerol narrowed the crystal size distribution and increased crystallinity in the keratin molecule.

Figure 4:
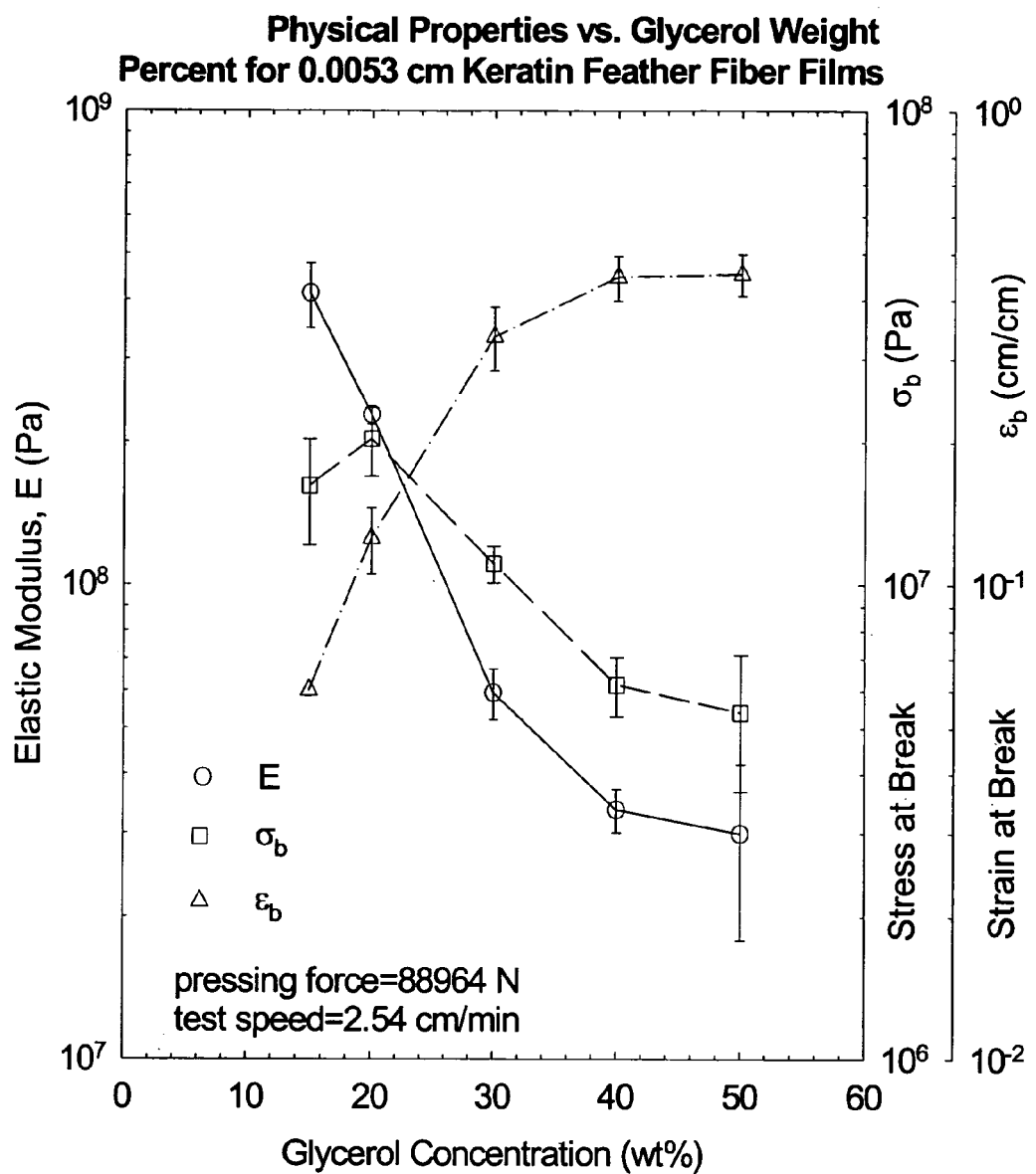
FIG. 4 shows effect of glycerol concentration on films made from 0.0053 cm long keratin feather fiber (test speed is 2.54 cm/min.)

Effect of glycerol concentration: FIG. 4 shows the dependence of the film physical properties on glycerol content. The films were pressed at 160° C. and 88964 N for 2 minutes. The keratin films became more ductile with the addition of glycerol. However, there was a limiting amount of glycerol that could be added. Films with 60 wt % glycerol or greater were very incomplete after pressing, i.e., the films contained "holes". Reduction of the pressing force or time did not result in a cohesive film. At 15 wt % glycerol, the films appeared to fail at defects in the structure resulting in the lower stress at break values. The defects seemed to originate in the lack of glycerol because inspection of these films showed some un-melted keratin material. When the glycerol content was 30 wt % or greater, some glycerol began to diffuse out of the films after about 12 hours at room temperature.

Figure 5:
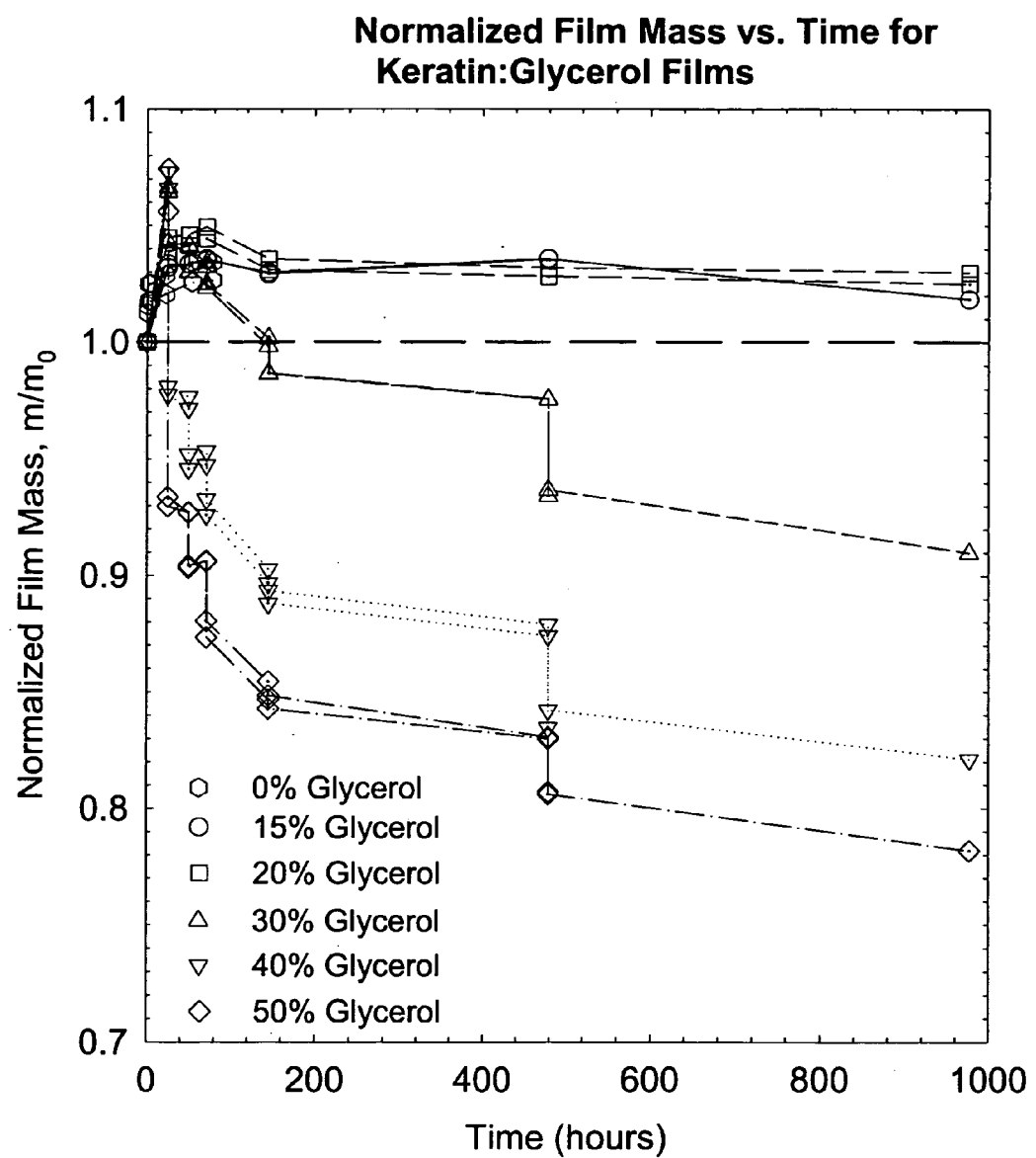
FIG. 5 shows normalized film mass as a function of time (periodically the film surfaces were wiped clean and weighed showing glycerol loss and water absorption)

Loss of glycerol: FIG. 5 shows a plot of the mass of keratin/glycerol films as a function of time. In FIG. 5, the mass of the films over time, m, was normalized by the original mass of each film, $m_0$. Initially, all of the films gained mass immediately after pressing ($m/m_0 > 1$). This was a slight re-hydration of the films. For 0 to 20 wt % glycerol, the films absorbed about 3% by weight of water from the atmosphere and reach equilibrium. However, for glycerol contents of 30 wt % or higher, the glycerol began to diffuse out of the film. Two $m/m_0$ values at a given time showed the removal of the glycerol from the surface of the film by wiping. The curves should theoretically approach the original mass of keratin in the film if all of the glycerol was lost. However, some of the glycerol was retained as desorption stopped after about 500 hours and the limiting value of the keratin weight fraction was not reached.

For the films with 30 wt % glycerol or higher, the films seemed to retain about $m/m_0 = 0.2$–0.3 of glycerol. For example, the 30, 40, and 50 wt % glycerol films reached equilibrium at $m/m_0 = 0.91$, 0.82, and 0.78, respectively. This corresponded to $m/m_0 = 0.21$, 0.22, and 0.28 retention of glycerol. There appeared to be a similarity in the physical property dependence on glycerol content and the amount of glycerol retained by the films. In other words, adding more glycerol after about 30 wt % did not result in a significant reduction in modulus or yield stress or a significant increase in yield strain. Likewise, adding more glycerol than about 20–30 wt % resulted in loss of that glycerol through desorption out of the film. The optimal amount of glycerol needed as a plasticizer appeared to be about 20–30 wt %. However, using higher amounts may aid in the thermal processing by reducing viscosity.

The DSC results shown in FIG. 3 (and Table I) were performed on the films after the glycerol had desorbed from the films, i.e., after over a thousand hours had passed after pressing and sitting at ambient conditions. The 20 to 50 wt % glycerol films had a very defined melting peak although the 30 and 50 wt % peaks were larger and more defined. The pure keratin before pressing had a broad melting peak while the films with less than 20 wt % glycerol had a very shallow and broad melting peak. The 20 to 50 wt % glycerol films also had a well-defined low temperature denaturation peak whereas this peak was small or non-existent in the pressed films with less than 20 wt % glycerol. So, the thermal analysis also showed decidedly different behavior above and below about 20 wt % of glycerol.

The keratin feather fiber has 40% hydrophilic groups and 60% hydrophobic groups as shown in Table II. Hydrophobic and hydrophilic groups are fairly evenly distributed along the fowl feather keratin molecule. Therefore, it is possible that glycerol will dissolve in the hydrophilic portions of the chain all along the length. The significance of the 20 to 30 wt % maximum glycerol accepted into the structure of the keratin may be related to the amount of serine, threonine, and tyrosine, each amino acid containing a side chain —OH group, in the chicken feather keratin. Serine is very evenly distributed along the keratin molecule. Fowl feather keratin contains about 17% serine, 4% threonine and 1% tyrosine, which at 22% total is roughly the amount of glycerol that was accepted into the keratin structure. So this means that the weight of glycerol ($w_g$) accepted into the protein structure divided by the total film weight ($w_T$) is approximately the percentage of S+T+Y (0.22) times the weight of the keratin in the film ($w_k$), e.g., $w_g/w_T=0.22*w_k$. Converting the data in FIG. 5 from grams (weight) to moles (number of —OH groups) shows that the moles of —OH in S+T+Y, mol[S+T+Y], is about the moles of —OH in glycerol (glycerol has 3 —OH groups per molecule), mol[glycerol], e.g., mol[S+T+Y]=mol[glycerol]/3.

Figure 6:
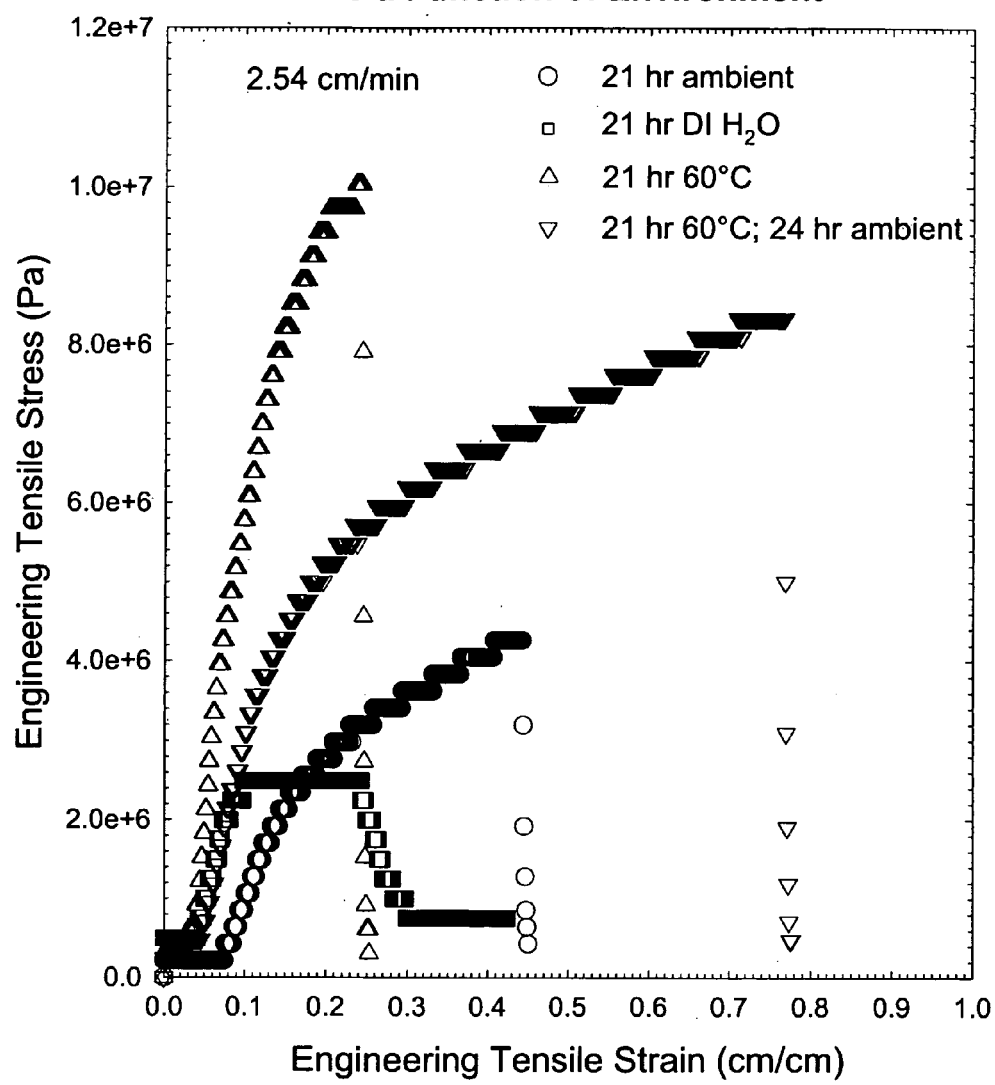
FIG. 6 shows effect of film treatment on 50:50 wt % films made from 0.0053 cm long keratin feather fiber and glycerol (test speed is 2.54 cm/min.)

Effect of water content of films: FIG. 6 shows representative engineering stress-strain curves for 50:50 wt % 0.0053 cm keratin feather fiber/glycerol films treated several different ways. Multiple samples were tested for each and all exhibited similar behavior to the curves shown for each condition. All of the samples were pressed and then held: (a) at ambient conditions for 21 hours, (b) in de-ionized water (DI $H_2O$) for 21 hours, (c) in a convection oven at 60° C. for 21 hours, (d) in a convection oven at 60° C. for 21 hours followed by ambient conditions for 24 hours. After each treatment, any glycerol or water on the films was wiped off. Soaking the films in de-ionized water resulted in a similar modulus as the film held at ambient conditions, but there was lower stress and strain at break. So water exchanges with the glycerol in the keratin structure. The glycerol added ductility and strength to the film. Holding the film at 60° C. resulted in a large increase in modulus and stress at break over the film held at ambient conditions for the same period of time. However, the film treated at 60° C. had a lower strain at break. DSC showed a shift in the melting point from 241° C. to 248° C. for films right after pressing and after 21 hours at 60° C., respectively. For these films, the annealing at 60° C. resulted in a modification of the crystal structure and a concurrent increase in the modulus and stress at break. But some loss of glycerol had made the film more brittle. Allowing this film to re-hydrate by holding at ambient for 24 hours after annealing decreased modulus and stress at break slightly but increased strain at break several times. This showed that the film properties were optimized when the keratin was allowed to absorb water from the atmosphere to an equilibrium value.

The de-ionized water that was used to soak the keratin/glycerol films was analyzed using solution nuclear magnetic resonance (NMR) spectroscopy. It was found that glycerol was indeed present in the water. There was a loss of glycerol but it had not been determined if that glycerol was from the "free" fraction or the "bound" fraction in the keratin structure.

Thus it was surprisingly easy to obtain clear films made from keratin utilizing a standard polymer processing technique. The films had good physical properties and had a wide variety of uses. The films made here were made without the use of reducing agents or time-consuming reduction processes. In the case of wool keratin, the amount of cystine is high and therefore the material may be too cross-linked to employ the simple processing method used here. In addition, wool has a very different, more complex microscopic structure than feather and it may be correspondingly more difficult to alter its morphological structure. Feather keratin can be reduced but apparently it does not have to be. The low amount of cysteine in the amino acid sequence may not result in a fully cross-linked network as traditionally defined. This may make the feather keratin unique for processing without reducing agents. It is possible that the S—S bonds between cystine molecules simply result in a large increase in molecular weight, i.e., where monomers of 10,500 g/mol are connected through S—S bonds to form very high molecular weight molecules. The high mechanical properties and possible receptivity to cells may make keratin an excellent substrate for cell culturing or tissue engineering applications. The ability to thermally process the material would be advantageous in forming the complex three-dimensional shapes required for certain tissue engineering applications.

All of the references cited herein are incorporated by reference in their entirety. Also incorporated by reference in their entirety are the following references: Aklonis, J. J., and W. J. MacKnight, Introduction to Polymer Viscoelasticity, Wiley-Interscience, 1983; K. M. Arai, K. M., et al., Eur. J. Biochem., 132: 501 (1983); Bigi, A., et al., Therm. Anal. and Cal., 61: 451 (2000); Ferry, J. D., Viscoelastic Properties of Polymers, John Wiley and Sons, 1980; Feughelman, M., Mechanical Properties and Structure of Alpha-Keratin Fibres, University of New South Wales Press, 1997; Fraser, R. D. B., et al., Keratins: Their Composition, Structure, and Biosynthesis, Charles C. Thomas Publisher, 1972, p. 31; Fraser, R. D. B., and T. P. MacRae, Molecular structure and mechanical properties of keratins, Symposia of the Society for Experimental Biology, Number XXXIV: The Mechanical Properties of Biological Materials, Cambridge University Press, 1980, p. 211–246; Feughelman, M., Mechanical Properties and Structure of Alpha-Keratin Fibres, University of New South Wales Press, Sydney, 1997; Gassner, G., et al., U.S. Pat. No. 5,705,030; Murayama-Arai, K., et al., Eur. J. Biochem., 132: 501–507 (1983); Parkinson, G., Chem. Eng., 105(3):21(1998); Okamoto, S., and T. Setagaya-ku, Cereal Foods World, 23: 256 (1978); Orliac, O., et al., Ind. Crops and Prod., 18: 91 (2003); G. Parkinson, G., Chem. Eng., 105(3): 21 (1998); Purslow, P. P., and J. F. V. Vincent, J. Exp. Biol., 72: 251–260 (1978); Schmidt, W. F., and S. Jayasundera, Microcrystalline keratin fiber IN Natural Fibers Plastics, and Composites-Recent Advances, F. Wallenberger and N. Weston, ed., Kluwer Academic Publishers, 2003; Schmidt, W. F., and M. J. Line, Physical and chemical structures of poultry feather fiber fractions in fiber process development, TAPPI Proceedings: 1996 Nonwovens Conference, p. 135–140; Schrooyen, P. M. M., et al., J. Agric. Food Chem., 48: 4326–4334 (2000); Schrooyen, P. M. M., et al., J. Agric. Food Chem., 49: 221–230 (2001); Vincent, J., Structural Biomaterials, Princeton University Press 1990; Yamauchi, K., et al., J. Biomed. Mat. Res., 31: 439 (1996); Yamauchi, K., et al., J. Biomat. Sci. Pol. Ed., 9: 259 (1998); Yamauchi, K., et al., Mat. Sci. Eng. C, 23: 467 (2003); Pol. Deg. Stab., 79: 511–519 (2003); Pol. Int., 49: 127–134 (2000); J. Appl. Pol. Sci., 91: 2123–2319 (2004).

Also incorporated by reference in their entirety are the following U.S. Pat. Nos.: 6,669,620; 6,601,338; 6,436,324; 6,348,524; 5,873,194; 5,866,269; 5,783,504; 5,759,569; 5,729,929; 5,672,434; 5,543,164; 5,536,807; 5,510,076; 5,498,453; 5,484,881; 5,412,090; 5,336,036; 5,314,754; 5,294,249; 5,292,362; 5,189,833; 5,138,792; 4,845,888; 4,796,711; 4,702,787; 4,686,790; 4,384,537; 4,047,327; 3,955,319; 3,949,145.

Thus, in view of the above, the present invention concerns (in part) the following:

A composition suitable for making films, said composition comprising (or consisting essentially of or consisting of) keratin obtained from avian feathers and at least one OH containing plasticizer.

The above composition, wherein said OH containing plasticizer is selected from the group consisting of ethylene glycol, propylene glycol, glycerol, sorbitol, $(HCOHCH_2)_n$ where n is about 1 to about 100, and mixtures thereof.

The above composition, wherein said OH containing plasticizer is selected from the group consisting of ethylene glycol, propylene glycol, glycerol, $(HCOHCH_2)_n$ where n is about 1 to about 9, and mixtures thereof.

The above composition, wherein said OH containing plasticizer is selected from the group consisting of ethylene glycol, propylene glycol, glycerol, and mixtures thereof.

The above composition, wherein said OH containing plasticizer is glycerol.

The above composition, wherein said OH containing plasticizer is selected from the group consisting of sorbitol, $(HCOHCH_2)_n$ where n is about 10 to about 100, and mixtures thereof.

The above composition, wherein said OH containing plasticizer is selected from the group consisting of ethylene glycol, propylene glycol, glycerol, $(HCOHCH_2)_n$ where n is about 1 to about 9, and mixtures thereof, and wherein said OH containing plasticizer is also selected from the group consisting of sorbitol, $(HCOHCH_2)_n$ where n is about 10 to about 100, and mixtures thereof.

The above composition, wherein said keratin is selected from the group consisting of avian feather fiber keratin, avian feather quill keratin, and mixtures thereof.

The above composition, wherein said keratin is avian feather fiber keratin.

The above composition, wherein said keratin is present in an amount from about 50 percent to about 99 percent by weight or volume and wherein said OH containing plasticizer is selected from the group consisting of ethylene glycol, propylene glycol, glycerol, $(HCOHCH_2)_n$ where n is about 1 to about 9, and mixtures thereof.

A film produced from the above composition, wherein said film is produced by a process comprising (or consisting essentially of or consisting of) mixing said plasticizer with said keratin and pressing the resulting mixture into a film.

A molded article prepared from the above composition.

A method of crop cultivation, comprising (or consisting essentially of or consisting of) providing a film containing the above composition, spreading said film along the ground, and providing suitably spaced holes in said film, or using pre-prepared holes in said film, to sow seeds or plant seedlings.

A protein-based film, comprising (or consisting essentially of or consisting of) at least one protein and at least one OH containing plasticizer, wherein said protein is a protein whose PE value is $\geq 2.5$ where $PE=(S+T+Y)/C$ where PE is plasticizer efficiency and where S, T, Y, and C are the amino acids serine, threonine, tyrosine, and cysteine, respectively, in said protein.

The above protein-based film, wherein said protein is keratin obtained from avian feathers.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

TABLE I

DSC results for keratin and 50:50 wt % keratin/glycerol samples

| Sample | $T_h$ (° C.) | $\Delta Q_h$ (J/g) | $T_m$ (° C.) | $\Delta Q_m$ (J/g) |
|---|---|---|---|---|
| 0.053 mm fiber | 121 | 209.2 | 235–250 | 79.54 |
| 0.053 mm fiber pressed | 121 | 100.8 | 235–250 | 39.45 |
| 0.053 mm fiber/glycerol paste | 152 | 324.0 | 240 | 122.8 |
| 0.053 mm fiber/glycerol pressed | 134 | 226.1 | 253 | 120.3 |

TABLE II

Amino acid sequence of feather keratin

| Amino acid | # residues/100 residues | Nature of amino acid |
|---|---|---|
| Alanine (Ala) | 4.2 | Hydrophobic |
| Arginine (Arg) | 5.2 | Hydrophilic |
| Asparagine (Asn) | 3.1 | Hydrophilic |
| Aspartic Acid (Asp) | 2.1 | Hydrophilic |
| Cysteine (Cys) | 7.3 | Hydrophobic |
| Glutamic Acid (Glu) | 2.1 | Hydrophilic |
| Glutamine (Gln) | 5.2 | Hydrophilic |
| Glycine (Gly) | 11.5 | Hydrophobic |
| Isoleucine (Ile) | 5.2 | Hydrophobic |
| Leucine (Leu) | 6.3 | Hydrophobic |
| Phenylalanine (Phe) | 4.2 | Hydrophobic |
| Proline (Pro) | 11.5 | Hydrophobic |
| Serine (Ser) | 16.7 | Hydrophilic |
| Threonine (Thr) | 4.2 | Hydrophilic |
| Tyrosine (Tyr) | 1.0 | Hydrophilic |
| Valine (Val) | 9.4 | Hydrophobic |

We claim:

1. A composition suitable for making films, said composition comprising keratin obtained from avian feathers and at least one OH containing plasticizer, wherein said keratin has not been subjected to reduction or oxidation agents.

2. The composition according to claim 1, wherein said OH containing plasticizer is selected from the group consisting of ethylene glycol, propylene glycol, glycerol, sorbitol, $(HCOHCH_2)_n$ where n is about 1 to about 100, and mixtures thereof.

3. The composition according to claim 1, wherein said OH containing plasticizer is selected from the group consisting of ethylene glycol, propylene glycol, glycerol, $(HCOHCH_2)_n$ where n is about 1 to about 9, and mixtures thereof.

4. The composition according to claim 1, wherein said OH containing plasticizer is selected from the group consisting of ethylene glycol, propylene glycol, glycerol, and mixtures thereof.

5. The composition according to claim 1, wherein said OH containing plasticizer is glycerol.

6. The composition according to claim 1, wherein said OH containing plasticizer is selected from the group consisting of sorbitol, $(HCOHCH_2)_n$ where n is about 10 to about 100, and mixtures thereof.

7. The composition according to claim 1, wherein said OH containing plasticizer is selected from the group consisting of ethylene glycol, propylene glycol, glycerol, $(HCOHCH_2)_n$ where n is about 1 to about 9, and mixtures thereof, and wherein said OH containing plasticizer is also selected from the group consisting of sorbitol, $(HCOHCH_2)_n$ where n is about 10 to about 100, and mixtures thereof.

8. The composition according to claim 1, wherein said keratin is selected from the group consisting of avian feather fiber keratin, avian feather quill keratin, and mixtures thereof.

9. The composition according to claim 1, wherein said keratin is avian feather fiber keratin.

10. The composition according to claim 1, wherein said keratin is present in an amount from about 50 percent to about 99 percent by weight or volume and wherein said OH containing plasticizer is selected from the group consisting of ethylene glycol, propylene glycol, glycerol, $(HCOHCH_2)_n$ where n is about 1 to about 9, and mixtures thereof.

11. A film produced from the composition according to claim 1, wherein said film is produced by a process comprising mixing said plasticizer with said keratin and pressing the resulting mixture into a film.

12. A molded article prepared from the composition according to claim 1.

* * * * *